United States Patent [19]
Rehder

[11] Patent Number: 5,853,294
[45] Date of Patent: Dec. 29, 1998

[54] ANTI-FRICTION ROTATING CONTACT ASSEMBLY

[76] Inventor: Robert Henry Rehder, 14 Middleton Drive, Peterborough, Canada, K9J 4Z2

[21] Appl. No.: 768,649

[22] Filed: Dec. 18, 1996

[51] Int. Cl.[6] .................................................... H01R 39/00
[52] U.S. Cl. ................................................ 439/17; 439/19
[58] Field of Search .................................. 439/13, 17, 19

[56] References Cited

U.S. PATENT DOCUMENTS

| | | | |
|---|---|---|---|
| 2,983,891 | 5/1961 | Seeloff | 439/17 |
| 3,581,267 | 5/1971 | Schreffler | 439/17 |
| 5,395,247 | 3/1995 | Garzon | 439/17 |

*Primary Examiner*—Neil Abrams
*Assistant Examiner*—T. C. Patel
*Attorney, Agent, or Firm*—E. H. Oldham

[57] ABSTRACT

This invention relates to a rolling electrical contact assembly which is very similar to an anti-friction bearing. The contact has an inner and outer race made of a conductive material. A set of conductive rollers roll around in the space between the races. A cage (insulating) keeps the rollers in proper spaced relationship. The outer race is stationary and is composed of segments having V-shaped spaces between the segments and is connected to an electrical cable, and the inner race which rotates on a shaft is connected by a cable carried by the shaft to a suitable current destination. The segments of the outer race are spring loaded to improve the contact conductivity between the rollers and the inner and outer races.

14 Claims, 4 Drawing Sheets

ANTI-FRICTION ROTATING CONTACT ASSEMBLY

BACKGROUND OF THE INVENTION

This invention relates to a rotating assembly which is capable of transferring electric current from a stationary member to a rotating member. The device resembles a roller bearing but has a special construction to enable the device to carry relatively large currents. The device consists of a stationary outer race, and a rotating inner race between which a series of rollers rotate inside a "bearing cage".

Both the inner race and the outer race are provided with a current conducting braid to conduct the heavy currents to and from the device. The current is carried between the rotary and stationary races by means of conductive rollers which are contained in a non-conducting cage.

In any type of electrical apparatus that carries current and has moving parts e.g. electrical switch gear, circuit breakers, commutators, slip rings, etc., there is need for some type of sliding contact to transfer current from the moving contact to the stationary contact. Prior art sliding contacts including flexible shunts, spring loaded contacts and spring washers have various advantages and disadvantages.

As a result, there is need for a rotating contact which is capable of operation from zero to relatively high rotational speeds and is able to transfer a high current from the rotating contact to a stationary one (or vice versa). The contact of this invention is capable of transferring current even when the shaft on which it is mounted is stationary.

PRIOR ART

The following references are interesting and are pertinent to applicant's invention:

| U.S. patents | 3,216,262 - November 9, 1965 |
| --- | --- |
| | 4,846,695 - July 11, 1989 |
| | 4,894,014 - January 16, 1990 |
| | 5,125,845 - June 30, 1992 |
| | 5,395,247 - March 7, 1995 |

Of the above references, U.S. Pat. No. 5,395,247 appears to be most pertinent to applicant's invention.

SUMMARY OF THE INVENTION

Briefly stated the present invention is directed to a rotating contact which in one embodiment utilizes at least one race which is of such construction that the outer stationary race is adjustably spring loaded in order to change the compressive force on the bearings located between the inner and outer races. The races themselves are produced from a material which is conductive and the surfaces may be coated with a layer of highly conductive material to assist in the current transfer.

A further extension of the invention comprises, a contact assembly having a stationary outer race composed of a plurality of somewhat V-shaped conductive segments of specific size and spacing. Each segment is anchored in its respective position to prevent rotation, yet is biased inwardly to apply a compressive force to the conductive rolling elements located between the inner rotating race and the stationary segments of the outer race.

The need for a rotating type of contact which will replace the sliding contacts ever present in rotating apparatus is self evident. The prior art methods as shown by the aforementioned prior art usually utilize sliding contacts to transfer current from a stationary contact to a moving contact. In order to transfer large currents, between such sliding contacts, the pressure between the contacts must be substantial.

If carbon brushes are utilized to accomplish the transfer of current, the problem of dealing with sliding friction between the stationary and rotary contacting devices is ever present, but heat in the transfer device must be dealt with and the ever presence of the carbon dust may give rise to current conduction in areas where no conduction is desired and the presence of brushes provides ample opportunity for maintenance of the brushes, holders, etc. and the contacts which carry the current at the brush ends.

It is to replace such contacts that this invention is directed. Not only does this invention replace the sliding friction type contacts with a rolling type anti-friction device, but the problems of maintenance are overcome by the rolling contact of this invention.

Other features and advantages of the present invention will become apparent as the description proceeds.

Figure 1:
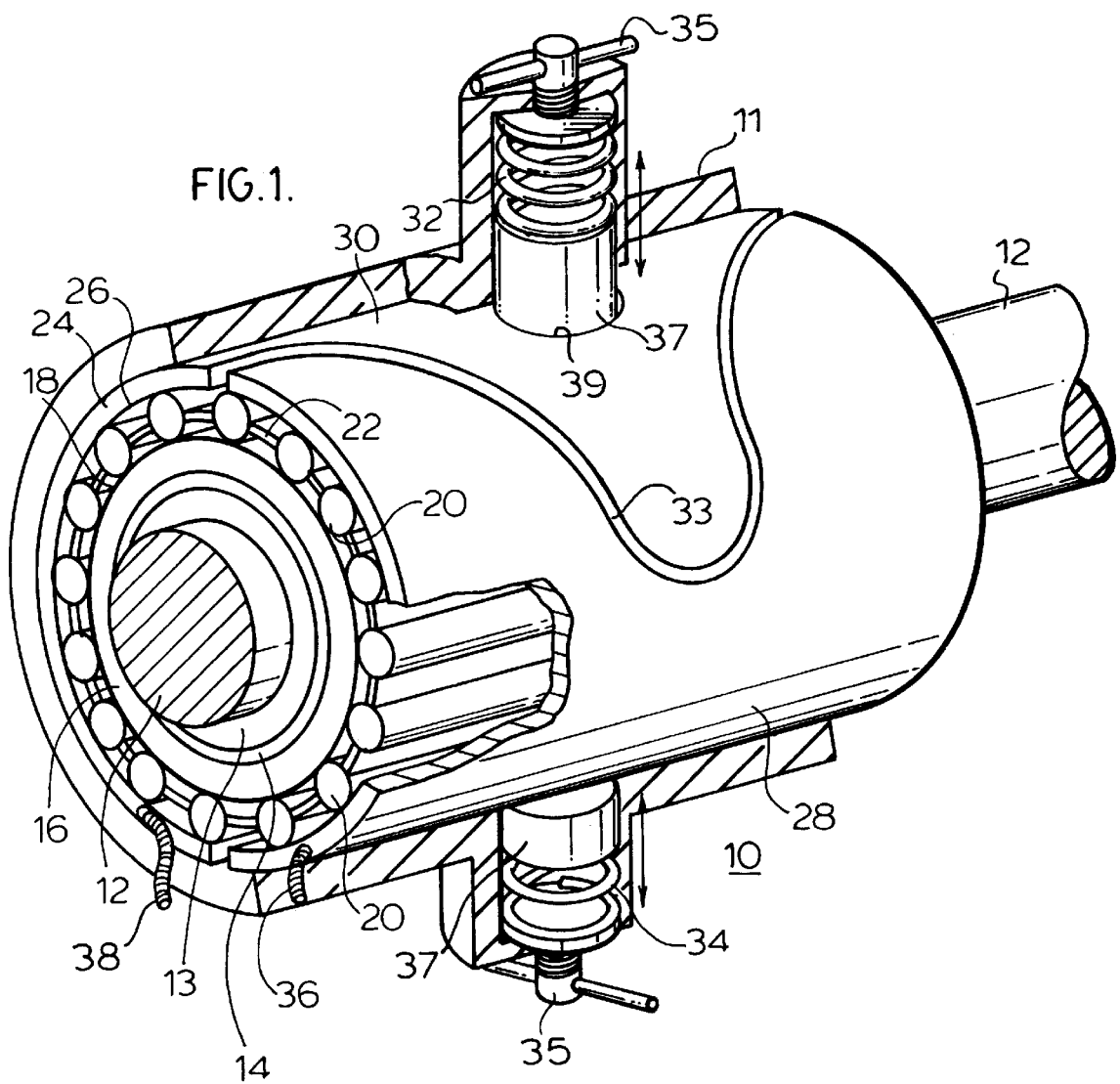
FIG. 1 is a perspective view of a rotating "roller" contact of this invention.

Referring to the drawings, there is shown in FIG. 1 a perspective view of the "roller" rotating contact assembly 10 according to a preferred embodiment of this invention. The contact assembly is housed in housing 11 which is mounted in a frame assembly (not shown) so as to remain stationary.

Contact 10 comprises a shaft 12 mounted in suitable bearings in housing 11 (bearings not shown) for rotation about its central axis. Shaft 12 is preferably composed of steel on which is fitted a sleeve 13 of an aluminum alloy on which is mounted a sleeve 14 of a suitable insulating material over which is mounted a conductive sleeve 16 composed of a conductive material such as copper.

The surface 18 of sleeve 16 is coated with a layer of a highly conductive material such as silver.

A plurality of bearing rollers 20 are mounted in cage 22 for rotation about sleeve 16. Rollers 20 are preferably cylindrical type rollers composed of a conductive material such as alloys of copper, e.g. beryllium or chromium and the surfaces of rollers 20 are coated with a layer of highly conductive material such as silver. Cage 22 which is composed of a suitable insulating material such as polytetrafluoroethylene, polyformaldehyde, NYLON® or other suitable material or composite materials such as NYLON® reinforced with glass fiber which serves to keep rollers 20 perfectly spaced within the races.

Surrounding the rollers 20 is an outer race 24 which is composed of a suitable material such as copper or a beryllium copper alloy, the inner surface of which is coated with a layer 26 of a highly conductive material such as silver. The sleeve 24 is actually a composite of at least a pair of interlocking segments 28 and 30 which are separated by a somewhat V shaped space 33. The segments 28 and 30 are loaded by a series of adjustable springs 32 and 34 (only 2 of which are shown) to provide for an adjustable force for pushing the various parts of the "bearing" contact together. Springs 32 and 34 are housed in housing 11 and are provided with adjusting screws 35 to bear on springs 32 and 34. Springs 32 and 34 bear on plugs 37 which are located in recesses 39 of segments 28 and 30. Plugs 37 may be made from an insulating material.

A pair of braids 36 and 38 are connected to segments 28 and 30 of outer "race" 24 to conduct current away from the outer race 24.

In operation, the steel shaft 12 does not carry any current because of the presence of insulating sleeve 14. The inner race 16 will have a conductive member (not shown) connected thereto which will be connected to the appropriate electrical destination on the rotating shaft 12.

Magnetically induced currents in the shaft 12 are kept to a minimum by the aluminum alloy sleeve 13 surrounding the shaft 12 which functions as a magnetic shield.

Current is fed into rotating inner race 16 from the rollers 20, which receive current from outer "race" 24 during the rotation of the rollers 20 inside the outer race 24.

A pair of braids 36 and 38 supply current to the stationary outer race 24. Springs 32 and 34 as shown in FIG. 1 adjust the pressure on the rollers 20 to accommodate different current densities carried by the rotating contact assembly 10, but other biasing devices may be used to provide pressure on the outer race.

Figure 2:
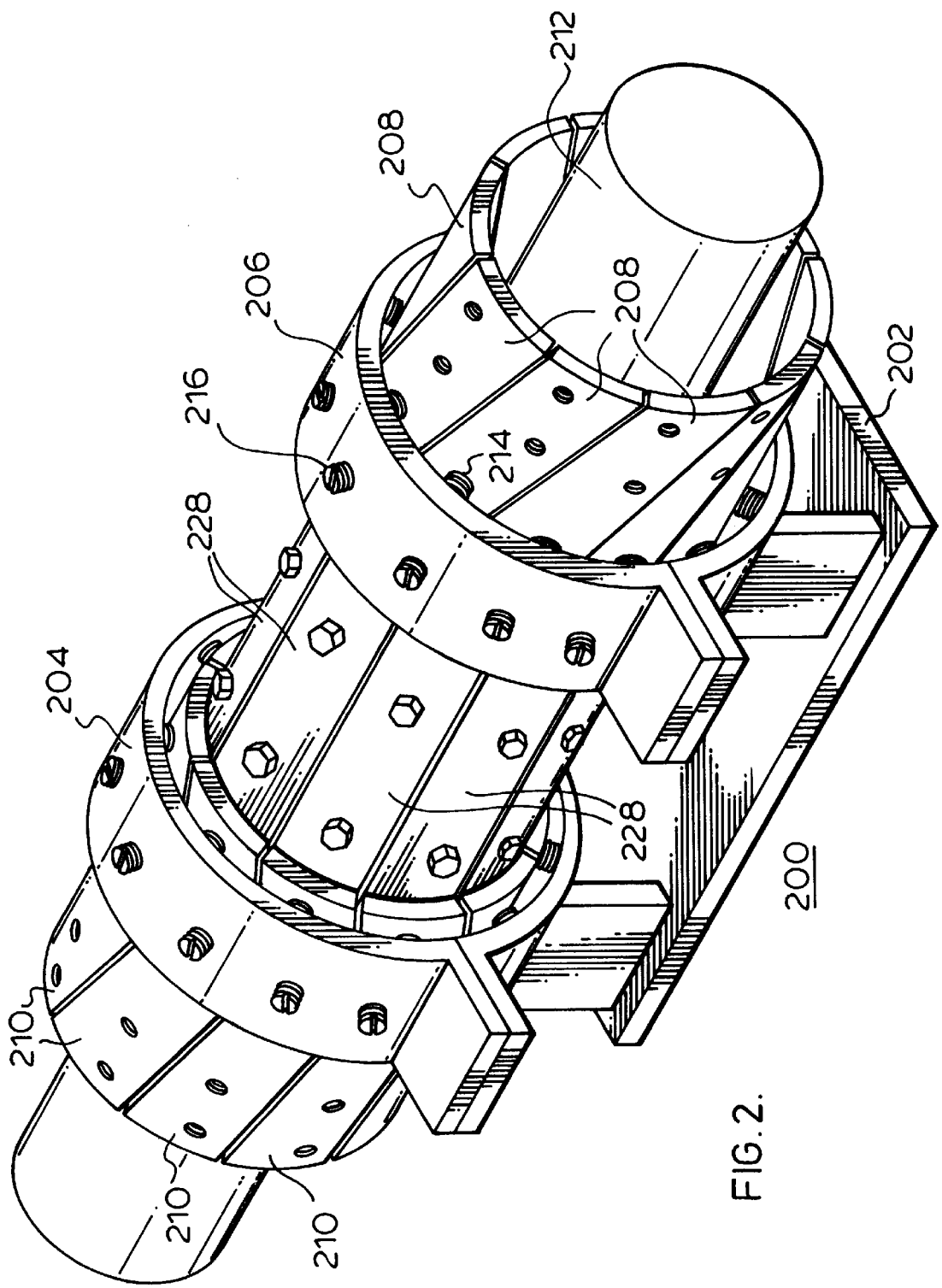
FIG. 2 is a perspective of a double bearing rotating contactor.

Another embodiment of the invention is shown in FIG. 2. With this particular configuration, it is possible to feed current to rotating conductors on a rotating shaft, and return the current from the rotating shaft back to stationary conductors on the machine. Here a "double" rotary contact 200 is shown in perspective. A base 202 is shown having a pair of supporting bands 204 and 206. Band members 204 and 206 remain stationary and provide a means for mounting segmented stator pieces shown as 208 and 210 thereon.

Also shown is a shaft 212 which is mounted in bearings (not shown).

Figure 3:
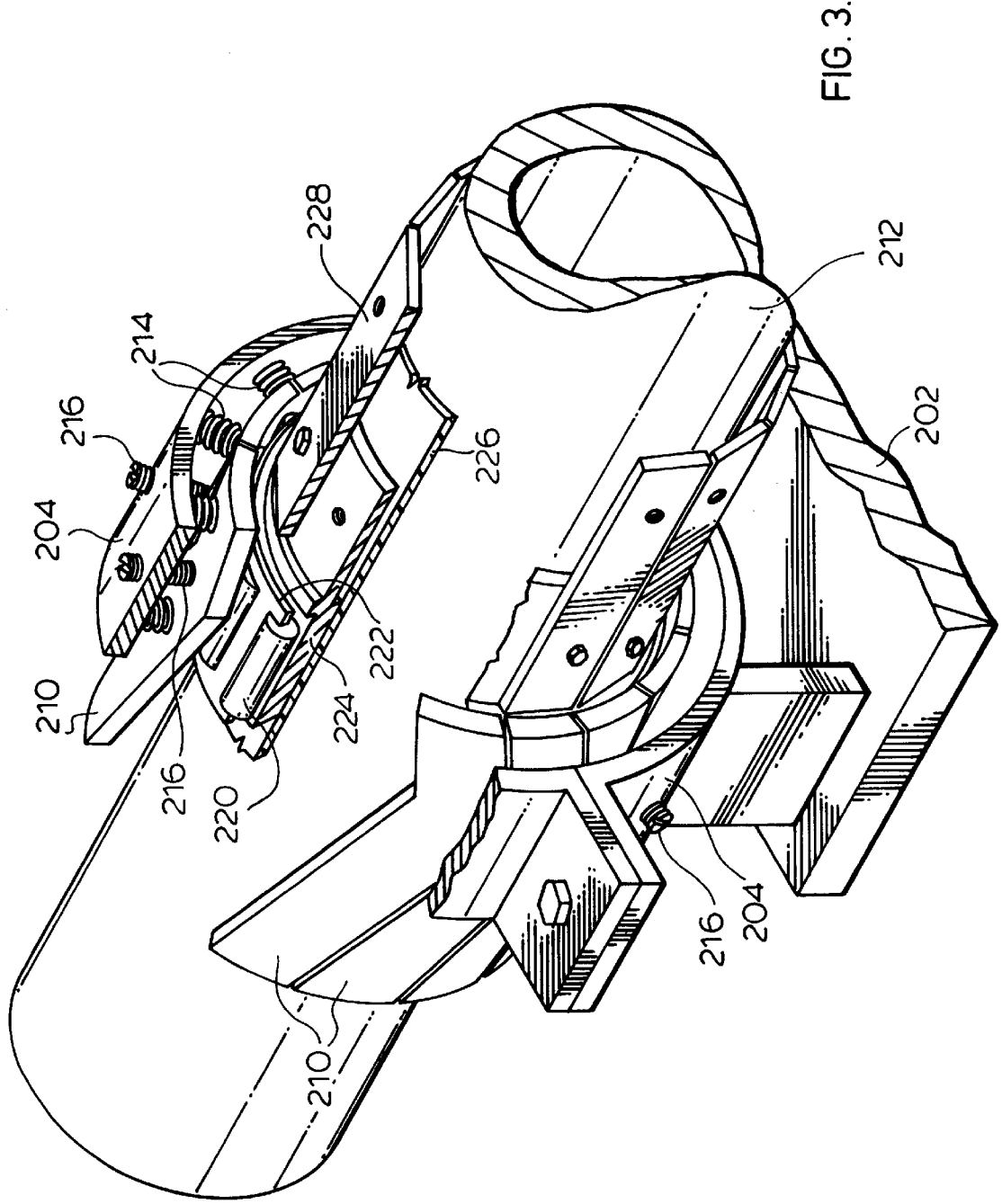
FIG. 3 is a partial perspective of the rotating contact of FIG. 2 having a cutaway portion.
Figure 4:
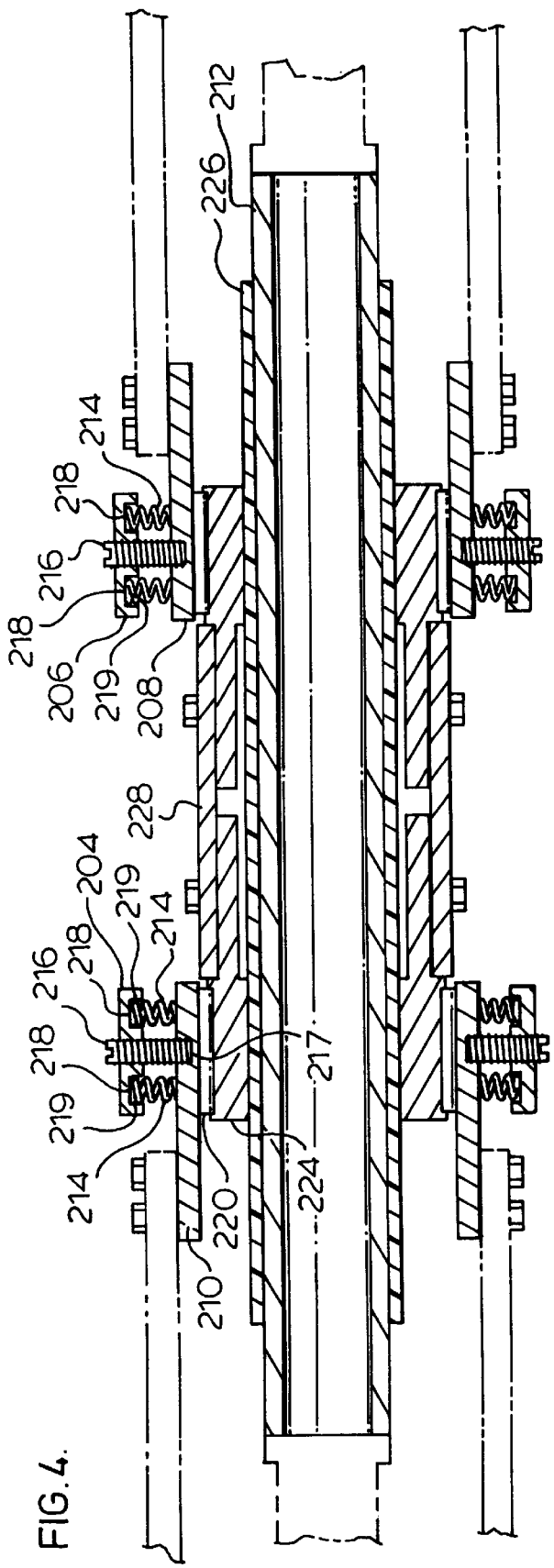
FIG. 4 is a cross-sectional view of the contactor of FIG. 3.
Figure 5:
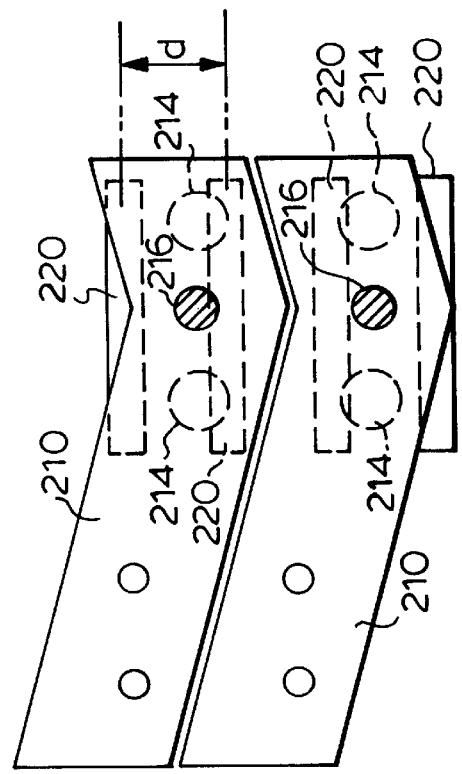
FIG. 5 is a representative drawing of a pair of outer segments of the rotating contactor of FIG. 4 to show the positioning of the captive rolling elements.

Referring now to FIGS. 3, 4, and 5, which illustrate the basic construction of the contactor of FIG. 2 in more detail, base 202 is shown supporting a band 204 as in FIG. 2. A plurality of stator segments 210 are supported inside band 204 by means of springs 214 and insulated threaded posts 216. Springs 214 are received in cylindrical depressions 217 in segments 210 and in slightly larger depressions 218 in the inside surface of band 204.

Depressions 218 each carry an insulating cap 219 in which springs 214 are seated. This prevents the band 204 from being exposed to the potential being experienced by the segments 210. Similarly, posts 216 are threaded into the support band 204 and into cylindrical recesses 217 in segments 210. The ends of posts 216 are received in cylindrical recesses 217 segments 210 as a sliding fit, and it is posts 216 which prevent the segmented stator from rotating with the rotor.

Segments 210 are manufactured from copper or a copper alloy which has a contact face coated with a highly conductive material such as silver.

Segments 210 engage rollers 220 in insulating bearing cage 222. Rollers 220, as previously, are composed of copper or a suitable copper alloy which is coated with a suitable conductive material such as silver. Bearing cage is preferably composed of an insulating material such as nylon.

The rollers 220 ride on an inner race 224 in the shape of a hollow cylinder. This race is preferable copper or a suitable alloy of copper, coated with silver on the surface engaging rollers 220. Race 224 is in the form of a barrel and is mounted on an insulating sleeve 226 which in turn is mounted directly on shaft 212. Thus, the shaft 212 is insulated from the potential existing on inner race 224.

FIG. 3 shows only one half of the rotary contact for FIG. 2, and bars 228 are bolted to inner race 224 and to the inner race of the portion of the rotary contact beneath support band 206. This is the mechanical configuration which would be used to transfer large currents from stationary contacts to a rotating contact on a shaft.

It will be seen that the segments 208 and 210 are spring loaded inside the supporting bands 206 and 204. In this instance, the bias force applied by springs 214 is not adjustable, but if necessary some scheme similar to that shown in FIG. 1 may be utilized to provide an adjustable biasing force for the outer race segments such as 210.

Referring specifically to FIG. 5 where a development of the segments 210 and the specific locations of the rollers 220 is shown, it will be seen that the distance "d" is critical. The distance "d" which is provided by bearing cage 220 spaces the rollers at a predetermined distance such that no more than two rollers 220 may be located under a single segment at one time. This assures that the contact force on the rollers between the races is consistent. This is due to the location of the springs 214 and the shape of segments such as 210. This is important in high transfer current applications.

The roller contact assemblies are capable of rotation at fairly high speeds (200 rpm and beyond, depending on the peripheral speeds of the contact surfaces) and also capable of the transfer of sizable currents.

This application has shown roller contacts and those skilled in the art will be well aware that ball contacts will also function to transfer current from the outer to the inner races.

It will be found that the presence of a lubricant in the form of a light anti-oxidant grease will extend the life of the contact surfaces by reducing the mechanical wear and simultaneously reducing the electrical losses caused by contact resistance. Lubrication of the cage assembly may be obtained through the use of self lubricating materials such as NYLON®.

In some instances, when the short circuit forces are not so great, the current conducting races and the enclosed roller or ball bearings may be composed of copper or a phosphor bronze alloy for lighter current carrying applications.

I claim:

1. A rotating contact assembly in the form of an anti-friction type bearing wherein a plurality of rolling elements are housed between a pair of races, each rolling element having a continuous cylindrical outer surface, conductive means attached to said races for conducting current to and from said races, adjustable biasing means for applying a variable pressure to said contact assembly to vary the pressure exerted on said rolling elements by said races.

2. A rotating contact assembly as claimed in claim 1 wherein said races and rolling elements are composed of a suitable alloy wherein copper is a major component.

3. A rotating contact as claimed in claim 2 wherein said races and rolling elements are plated with silver or an alloy thereof.

4. A rotating contact assembly in the form of a roller bearing, comprising an inner and an outer race, a plurality of rollers housed between the races, said rollers each having a continuous cylindrical outer surface, said outer race being of a split configuration having at least one "V" shaped slot extending across said race, and adjustable pressure means for applying variable pressure to said outer race to urge said at least one "V" shaped said slot to close, so as to preload rollers between the inner and outer races.

5. A rotating contact assembly as claimed in claim 4 wherein the contacting surfaces of the races and rollers is coated with a layer of a conductive metal.

6. A rotating contact assembly as claimed in claim 5 wherein the inner and outer races and rollers are composed of a suitable alloy wherein copper is the major component.

7. A rotating contact assembly as claimed in claim 6 wherein the contacting surfaces of the rollers and races is coated with silver or an alloy of which silver is the major component.

8. A rotating contact assembly mounted on a rotating shaft for conducting current from a stationary contact to contact mounted on said shaft, comprising at least one bearing type contact assembly consisting of:

at least one inner race mounted in an insulating relationship on said shaft, at least one outer race being mounted in a stationary member, a plurality of rolling elements being housed between said inner and outer races, each rolling element having a continuous cylindrical outer surface, conductive means connected to each race to provide a path for electrical energy flow to or from said races, adjustable biasing means to vary the pressure on said outer races to increase the contact pressure between said races and said rolling elements.

9. A rotating contact as claimed in claim 8 wherein the races and rolling elements are composed of an alloy wherein copper is the major component.

10. A rotating contact as claimed in claim 9 wherein the races and rolling elements are plated with an alloy wherein silver is the major component.

11. A rotating contact as claimed in claim 10 wherein the outer race is provided with pockets for receiving said biasing means.

12. A rotating contact assembly in the form of a roller bearing comprising an inner and an outer race, each race being in the form of a cylindraceous member, and being in a co-axial spaced relationship a plurality of rollers housed between said races and being maintained in first predetermined circumferentially spaced relationship by a suitable insulating bearing cage, each roller having a continuous cylindrical outer surface, said outer race being composed of a plurality of V-shaped segments mounted in said assembly adjacent each other to form a cylinder having V-shaped spaces between adjacent segments, the shape of said segments and the spacing of said segments being such that no more than two rollers contact any segment at any given time, adjustable biasing means for adjustably urging each segment of said outer race inwardly toward said inner race to provide a variable contact force on said rollers.

13. A rotating contact assembly as claimed in claim 12 wherein the races and rollers are composed of copper or an alloy thereof.

14. A rotating contact assembly as claimed in claim 13 wherein the races and rollers of said assembly are coated with silver or an alloy thereof.

* * * * *